US006254288B1

(12) United States Patent
Heyns et al.

(10) Patent No.: US 6,254,288 B1
(45) Date of Patent: Jul. 3, 2001

(54) INTEGRATED CIRCUIT CONTROLLED TRANSACTION MANAGEMENT SYSTEM

(76) Inventors: Guido Heyns, Eekhoornlaan 23B, B-3210 Linden; Peter Johannes, Edelzangerslaan 56/11, B-3010 Kessel-Lo, both of (BE)

( * ) Notice: Subject to any disclaimer, the term of this patent is extended or adjusted under 35 U.S.C. 154(b) by 0 days.

(21) Appl. No.: 08/894,284

(22) PCT Filed: Feb. 17, 1995

(86) PCT No.: PCT/BE95/00017

§ 371 Date: Jan. 26, 1998

§ 102(e) Date: Jan. 26, 1998

(87) PCT Pub. No.: WO96/25724

PCT Pub. Date: Aug. 22, 1996

(51) Int. Cl.⁷ .................................................. G06F 9/445
(52) U.S. Cl. ................................................................ 395/712
(58) Field of Search .............................. 395/712; 705/35

(56) References Cited

U.S. PATENT DOCUMENTS

| 3,670,144 | * | 6/1972 | Breslin et al. | 235/432 |
| 4,727,244 | * | 2/1988 | Nakano et al. | 235/380 |
| 4,810,862 | * | 3/1989 | Nakano et al. | 235/380 |
| 5,212,789 | * | 5/1993 | Rago | 707/8 |
| 5,270,898 | * | 12/1993 | Elms et al. | 361/96 |
| 5,486,876 | * | 1/1996 | Lew et al. | 348/719 |
| 5,794,218 | * | 8/1998 | Jennings et al. | 705/35 |
| 5,864,702 | * | 1/1999 | Walsh et al. | 713/320 |

FOREIGN PATENT DOCUMENTS

| 0 190 733 | 8/1986 | (EP) . |
| 2657445 | 7/1991 | (FR) . |
| 2667171 | 3/1992 | (FR) . |
| WO 87/07062 | 11/1987 | (WO) . |
| WO 94/10657 | 5/1994 | (WO) . |

* cited by examiner

*Primary Examiner*—Tariq R. Hafiz
*Assistant Examiner*—Chameli Chaudauri Das

(57) ABSTRACT

An integrated circuit controlled transaction management system using an interpreter which deals with the execution of an application, either on an ICC, or on a terminal or on both. The system is able to execute an application between the ICC and the terminal, connected or not to a central unit, when the interpreter in the terminal is able to access and to use at least a part of the terminal memory and at least a part of the terminal peripherals. An optional interpreter in the ICC is able to access and to use at least a part of the ICC memory and at least a part of the ICC peripherals.

13 Claims, No Drawings

INTEGRATED CIRCUIT CONTROLLED TRANSACTION MANAGEMENT SYSTEM

The present invention relates to an integrated circuit controlled transaction management system intended to execute a transaction between an integrated circuit card (ICC) and a terminal connected or not to a central unit, a transaction consisting of at least one execution of the following sequence:

1. creating a communication link between the ICC and the terminal;
2. performing a compatibility check to ensure that the ICC and the terminal are mechanically and electrically compatible;
3. selection of an application supported both by the ICC and the terminal, that means the selection of a computer program and the associated data set that defines the transaction in terms of the specific ICC and terminal combination present;
4. execution of said application on the ICC and terminal system, and
5. termination of the transaction, which optionally includes breaking of the communication link between the ICC and the terminal.

Document WO 92/13322 describes a secured method for loading a plurality of applications in a microprocessor memory ICC, containing means for creating a communication link in an ICC and terminal system.

There are several types of transactions between an ICC and a terminal: the terminal may control access to places where only ICC holders may have access to; in so-called financial transactions the ICC can be loaded with tokens representing consumption goods obtainable at a terminal site (e.g. frequent flyer miles, telecommunication units, etc....), or the ICC may act as a depository of bank account information which allows more general financial transactions; or the ICC may be used as data storage, e.g. as an identity ICC or medical record storage.

Known features of said ICC and terminal system are

1. The terminal hardware (i.e. the processor and the peripherals, which at least include the ICC communication device) is accessible via the terminal operating system. Terminal operating systems are vendor specific.
2. Each terminal that participates in certain types of standardised transaction types (e.g. international financial transactions) supports, for those transactions, a common standard allowing the ICCs to perform applications in a standard way with terminals from any vendor. By way of example, international financial transactions are currently based on the inter industry standards as defined in ISO 7810/7811/7812/7813/7816.
3. Each provider of standardised transactions on a terminal has to provide an application, i.e. a program and the associated data set, or an application specification, defined in terms of a common standard.
4. Some parties provide applications or application specifications that are only partly built on a common standard. For special requirements which are outside the scope of the common standard, said parties need to rely on the terminal operating system.
5. Other parties provide applications or application specifications, which are proprietary to them or which are not based on any common standard. In this case they solely rely on the terminal operating system to perform the transaction.
6. Each application program needs to be compiled and linked separately for each terminal type. This means that specific software has to be resident in the terminal for each application.
7. Applications define large sets of terminal parameters governing the rules of their acceptance. These parameters may need to be shared with other applications.
8. Application software must be physically installed in each terminal.
9. Different versions of application software defining the same transaction may be required on the terminal during more or less extended conversion periods.

The features associated with said known ICC and terminal system loaded with multiple applications, impose heavy constraints on the terminal hardware, which must be able to store and to manage all possible application software and the assorted data sets. Moreover, a considerable logistic effort is indispensable to manage the distribution and the maintenance of all the software in all the terminals. Those features have the following drawbacks:

Changing terminal software specifications or parts thereof, changing application software specifications or parts thereof or changing the implementations of a specification or parts thereof or creating new applications requires development of new software for each target terminal type and to load this new software in each target terminal. Moreover, certification against all ICC types in circulation at that moment and against those scheduled for future release is required;

Restricted flexibility because even minor changes to a common standard have to be agreed between all parties that use it;

Every application requires storage capacity on the terminal, which is limited;

Common standards are not complete enough to support all proprietary needs;

The applications need to be implemented carefully so that neither their programs, nor their parameters interfere with each other;

This approach reduces the ICC to a mere memory device, as it is not possible to give the ICC the control over each type of terminal due to the plethora of different operating systems in use.

The above mentioned drawbacks result in a lack of flexibility of said ICC and terminal system. Hence the time to market new, upgraded or improved applications is extremely long, in the order of several years as all ICCs and all terminals are affected.

The present invention aims to ease the management of all possible applications with all possible ICCs on all possible terminals. This purpose is achieved by means of an ICC transaction management system of the type described in the preamble of the enclosed claim 1 by using an interpreter which deals with the execution of an application either on the ICC, or on the terminal, or on both whereby the interpreter in the terminal is able to access and to use at least a part of the terminal memory and a part of the terminal peripherals, e.g. keyboard, display, printer, modem, while an optional interpreter in the ICC is able to access and to use at least a part of the ICC memory and at least a part of ICC peripherals, e.g. keyboard, display.

Indeed, an interpreter performs the interpretation between a program written in a compact high level and universal language and the language specific to operate the terminal or the ICC. For all practical purposes an interpreter consists of a program which reads an input stream (the interpreter on the ICC reads the input stream coming from the terminal and the interpreter on the terminal reads the input stream coming from the ICC) and of one or more dictionaries, whereby a dictionary is a collection of words, each referring to executable statements. The interpreter language is independent of the ICC and terminal system, and may e.g. be FORTH (see ANSI standard: X3J14 Secretary, c/o FORTH Inc. 111 Sepulveda Blvd. Suite 300, Manhattan Beach, Calif. 90266).

A first advantage of using an interpreter in an ICC controlled transaction management system according to the invention, is the possibility to store new applications or parts thereof or upgrades or improvements to existing applications or parts thereof on the ICC coded in an interpreted language. This allows to reduce the time to market new applications or to up-grade or improve existing applications or parts thereof.

Time or effort required to market new, upgraded or improved applications is reduced to the time or effort required to load them in terms of the interpreter language in the ICC, which may require loading new, improved or upgraded dictionaries on the ICC. In this way the ICC has control over the application. No time or effort is required to update terminals. Even when changes to terminal dictionaries must be made, it is sufficient to load the new, upgraded or improved definitions in the ICC during an introductory or reconversion period until the new upgraded or improved definitions are available on the terminal. It is possible to implement the ICC and terminal system in such a way that the new, upgraded or improved definitions in the ICC are transferred to the terminal during a transaction and stored permanently in the terminal memory thereafter.

Management of terminal functionality is reduced to the installation once of the same interpreter program and the same interpreter language dictionary, hereafter referred to as interpreter core dictionary, either during the manufacturing process of the terminal or thereafter. It is possible to upgrade or improve the interpreter after installation of the terminal, e.g. by means of on-line down-loading or through an ICC. Optional additional dictionaries, e.g. proprietary dictionaries or common standard dictionaries may be loaded on the terminal.

A second advantage of using an interpreter in an ICC controlled transaction management system according to the invention is that the support for many applications on the terminal is reduced to the availability on the terminal of the interpreter program and the interpreter core dictionary and identifications of the supported applications. Additional dictionaries are optional.

A third advantage of using an interpreter in an ICC controlled transaction management system according to the invention is the possibility for the ICC to fully define and hence control the application.

The present invention provides the possibility to efficiently manage many applications on many fundamentally different terminals and the possibility to install new or improved or upgraded applications or parts thereof in a very efficient way, to have an extremely short time to market of new, upgraded or improved transactions and to allow the ICC to control the transaction.

Positive implications of the above are:

Changing terminal software specifications only affects the interpreter implementation on that terminal. The only effort needed to maintain compatibility with existing applications is to ensure that the interpreter program and the interpreter core remain implemented correctly. Hence only one software needs to be recertified, and only against one specification, namely the interpreter definition. ICCs need not to be recertified as the interpreter language used in the application retains the same specification.

The need for common standards is reduced to the availability of the interpreter as each standard function can be coded in the interpreter language and stored in the ICC.

Introducing new, improved or upgraded applications needs not to affect dictionaries that have to be stored on the terminal, as all applications and related dictionaries are defined in terms of the interpreter language and can be loaded on the ICC.

The application data sets are all managed by the interpreter, which eases their management.

The ICC can take actively part in the execution of the application program or parts thereof by also implementing an interpreter program and core dictionary on the ICC. If the ICC is a mere memory ICC, it can still control the application by completely storing it, i.e. the terminal acts completely according to the ICC definitions.

Some applications may require specific security services, e.g. data integrity, ICC authentication, terminal authentication or data confidentiality. These can be provided with state of the art techniques as defined e.g. in ISO 10202.

According to a first particularity of the invention, an application consists of one or more functions, each function consisting of a controlling part referred to as the header of the function and an executable part referred to as the body of said function. The header determines which bodies have to be executed and under which conditions. Both parts of the function are able to be independently stored in a dictionary. Functions may be defined in terms of other functions, i.e. functions may be nested.

A body which is stored in a dictionary is accessible via its body name, and a header stored in a dictionary is accessible via its header name. This does not prevent in any way to program a function in the interpreter language, it merely offers the possibility to write compact and yet flexible applications by carefully mixing body names, header names and interpreter language code. Functions themselves can also be stored in dictionaries, referred to by means of their header names. This reference method allows to define each function in four ways:

1. Both the header and the body can be interpreter language code;
2. The header can be interpreter language code while the body is activated through its body name;
3. The header is defined through its header name, while the body is fully expanded interpreter language code;
4. Both the header and the body are stored as references, header name and body name respectively.

The invention allows the presence of several types of dictionaries in the ICC and terminal system:

1. the interpreter core, a mandatory dictionary;
2. a number of optional dictionaries including definitions relating to:
   a) certain types of standardized transactions, e.g. the dictionary containing all functions defined in ISO/IEC 7816 used in international financial transactions, referred to as the standard dictionary;
   b) proprietary transactions, requiring non standard definitions, referred to as proprietary dictionary;

The dictionary defined on the ICC may contain new, improved or upgraded functions or parts thereof. Those dictionaries normally take precedence over terminal dictionaries. However the security of some applications may prohibit the redefinition of certain words in certain dictionaries.

Security features can be provided through the specific protection mechanisms available in state of the art interpreter implementations.

The invention allows storage of an application efficiently on the ICC and allows for flexible execution on the ICC and terminal system. Indeed, the following storage scenarios are possible thanks to the invention:

1. The transaction fully adheres to a standard. This means that the ICC only has to store the function name of the application, which is defined in the standard dictionary on the terminal;

2. If the transaction is proprietary and the application is defined on the terminal it communicates with, the ICC only has to store the function name of the application, which is defined in the proprietary dictionary on the terminal;

3. If the transaction is proprietary and the application is not defined on the terminal it communicates with, the definition of the application must then be stored on the ICC, in the ICC dictionary. The functions of the application can use body names and header names of both the standard and the proprietary dictionaries, but can also include interpreter language code.

EXAMPLE 1

Assuming an application with the following header (given in pseudo-code):

if (x=1) then func_a(y)
   else if (x_2) then func_b(y)
      else func_c(y)

whereby func_a, func_b and func_c are defined in the terminal proprietary dictionary. Assuming func_a(y)=y+x, in that dictionary. Then the header as presented above is all that needs to be stored in the ICC to be able to execute it. In this case there is no need for an ICC dictionary. Now, assuming the interpreter implementation allows ICC dictionaries to take precedence over terminal dictionaries, and assuming the application provider wants to redefine func_a(y), into func_a(y)=y−x. In this case he can still use the same header, and he now has the choice to either update all proprietary dictionaries in all terminals, or to include the new definition in the ICC dictionary.

This new definition will then be used during the execution of the application.

The invention allows that:

a) a ICC dictionary can be used to add to, improve or upgrade terminal dictionary definitions. A mechanism to do this is e.g. provided in the FORTH language, where the words defined last can redefine earlier dictionary entries.

b) some dictionaries, e.g. the interpreter core or the standard dictionary for some applications, may be protected against erasure and against redefinitions. Techniques to achieve such protection are state of the art; an example is presented in patent WO90/05347.

The following execution scenarios are possible thanks to the invention:

1. The terminal executes the application program or parts thereof, whereby the ICC only acts as a data container and possibly as a storage device for the proprietary application program, or parts thereof.

2. Both the ICC and the terminal execute parts of the application. For security reasons it might be required that certain data do not leave the ICC, hence all manipulations involving such data must be executed by the ICC. Hence the ICC and the terminal communicate results of data manipulations instead of the data itself.

3. The ICC executes the application, whereby the terminal only needs to contain application identifications it supports. In this case the terminal may be used as a mere storage device, e.g. the terminal can provide the ICC with a dictionary that contains definitions of functions in terms of the interpreter language that are used during the execution of the application by the ICC.

This allows the ICC to use definitions without having to store them.

The above means that the invention brings following advantages:

1. The flexibility to define, improve or upgrade applications very easily and quickly by storing them on the ICC, relying on the terminal interpreter for execution and relying on the terminal interpreter core dictionary for definitions.

2. The flexibility to store applications in a compact way on the ICC using dictionaries on the terminal.

3. The flexibility to execute the application in either the ICC, the terminal or both ICC and terminal, depending on the availability of processing power in the ICC and the terminal.

4. The flexibility to allow multiple ICCs to participate in a transaction. The interpreter can be implemented in a terminal with multiple ICC readers.

In such a system it is possible to provide applications, either stored on one or more ICCs, a terminal or any combination of terminal and ICCs, that perform ICC to ICC transactions. In this case the terminal could be very simple, only providing the communication means between the ICCs and possibly providing some dictionaries to reduce the storage requirements on the ICCs.

The ICCs could also provide resources to each other.

5. The flexibility to control the transaction from both the ICC, the terminal or both the ICC and the terminal.

The transaction is the result of the execution of an application and hence is fully determined by the application program and the associated data set. As such control of the transaction or parts thereof is determined by the contribution from the ICC, the terminal or both the ICC and the terminal. When the transaction is fully determined by a terminal resident application the card can only contribute to the application with a data set it contains and then undergoes the transaction. When the transaction is fully determined by the ICC resident application, the terminal contributes to it with its data set and undergoes the transaction. The terminal and the ICC can also perform the transaction as equals, whereby both determine and perform the transaction. It may occur that the ICC and terminal system is connected to a central unit from which it requests additional services, in which case the central unit may dynamically contribute to the application. E.g. the ICC can force the terminal to connect to its central unit and request the update of data on the ICC. The control of the application does not need to be strictly on the ICC or on the terminal.

In an initial step an application has to be selected for execution on the ICC and terminal system. This selection is trivial when the ICC and the terminal have no application or exactly one application in common. When multiple applications are supported both by the terminal and by the ICC, the current practice is to let the ICC holder or the terminal operator define interactively which application is chosen. This is not precluded by the invention which also provides an intelligent mechanism to select the application, depending on ICC parameters, terminal parameters and ICC capabilities and terminal capabilities.

Indeed, after insertion of the ICC in the terminal and after the ICC has satisfied all compatibility checks, the first action the terminal undertakes is to check whether the ICC supports an application it knows. In order to find this out, the terminal will try to consecutively select one of its resident applications. If an application is present on the ICC, the ICC contains the description of the application. According to the invention, a possible body in the application header is an application select function. This application select function is to be executed by the interpreter with arguments determined by the ICC. This means that with an application supported by the terminal and defined in the ICC, the selection of one of the many applications only defined on the ICC is made possible. Since the bodies of an application selection function may be application select functions, the application may be selected recursively.

EXAMPLE 2

The following example is considered:

The ICC contains the following applications: Euro, Euro-Debit, Euro-Credit, U.S.-Debit, U.S.-Credit. The terminal only knows the application Euro. When the terminal inspects the ICC, the result of the select application function will be Euro and its related data.

The definition of application EURO can be stored either on the terminal or in the ICC. Assume it is stored in the ICC, then it could be defined as follows (in pseudo code):
start
if (ICC amount <100)
   then if (terminal is located in Europe) then select application Euro-Debit else if (terminal is located in U.S.) then select application U.S.-Debit else abort transaction
   else if (terminal is located in Europe) then select application Euro-Credit else if (terminal is located in U.S.) then select application U.S.-Credit else abort transaction
end transaction,
wherein
not underlined text means the header, and underlined text means a body.
In this case, the terminal only knowing EURO can select applications defined in the ICC.

Any implementation of the present invention entails the following effort:

1. If the ICC is to be used as a mere memory ICC:
   a) implementing a secure interpreter on the terminal, with its interpreter core dictionary;
   b) defining and implementing dictionaries for the application;
   c) implementing the application in the interpreter language, possibly making use of available dictionaries;
   d) implementing a mechanism to use the ICC dictionaries.
2. If the ICC takes an active part in the execution of the application:
   a) implementing a secure interpreter and its core dictionary on the terminal and implementing a secure interpreter and its core dictionary on the ICC.
   b) defining and implementing dictionaries for the applications;
   c) implementing the application in the interpreter language, possibly making use of the available dictionaries;
   d) implementing a mechanism on the terminal to use ICC dictionaries.
   e) implementing a mechanism on the ICC and the terminal to manage the execution of the applications on the ICC and terminal system
   f) implement a mechanism on the card to use terminal dictionaries.

The invention is obviously not limited to a transaction management system using a card. Many changes may be made in the shape, the arrangement and the constitution of the integrated circuit carrier, without departing from the scope of the invention, e.g. a key or a badge.

We claim:

1. An integrated circuit controlled transaction management system intended to execute between an ICC and a terminal connected or not to a central unit, a transaction consisting of at least one execution of the following sequence:
   a. creating a communication link between the ICC and the terminal;
   b. performing a compatibility check to ensure that the ICC and the terminal are mechanically and electrically compatible;
   c. selection of an application contained in the ICC and the terminal, that means the selection of computer program and the associated data set that defines the transaction in terms of the specific ICC and terminal combination present;
   d. execution of said application on the ICC terminal system, and
   e. termination of the transaction, which optionally includes breaking of the communication link between the ICC and the terminal,
   characterized in that it uses an interpreter which deals with the execution of an application, either on the ICC, or on the terminal or on both, whereby the interpreter in the terminal is able to access and to use at least a part of the terminal memory and at least a part of the terminal peripherals while an optional interpreter in the ICC is able to access and to use at least a part of the ICC memory and at least a part of the ICC peripherals.

2. Transaction management system according to claim 1, characterized in that each application consists of a number of functions, each function consisting of controlling part referred to as the header and an executable part referred to as the body of said function, both parts of said function possibly being independently stored in a dictionary.

3. Transaction management system according to claim 1, characterized in that functions may be nested.

4. Transaction management system according to claim 1, characterized in that a function in the application description is a "select application function" which is executed by the interpreter with arguments determined by the ICC, so that the application select may be executed recursively.

5. Transaction management system according to claim 1, characterized in that the ICC is a mere memory ICC which undergoes the transaction as determined by the terminal.

6. Transaction management system according to claim 5, characterized in that each ICC contains a differently personalised application.

7. Transaction management system according to claim 1, characterized in that the ICC determines the transaction and the terminal which needs only to recognise an application on the ICC and able to select it, undergoes the transaction.

8. Transaction management system according to claim 7, characterized in that the terminal is a pure interface device between a number of ICCs.

9. Transaction management system according to claim 1, characterized in that the ICC and the terminal both determine and perform the transaction.

10. Transaction management system according to claim 1, characterized in that an interpreter is implemented in a terminal with many ICC readers, and provided with applications, either on the ICC, terminal or both, that perform combination of transactions.

11. Transaction management system according to claim 1, wherein the system is adapted for upgrading or improving applications by loading upgraded or improved definitions on the ICC; transferring these to the terminal during a transaction and storing these permanently in the terminal memory.

12. Transaction management method according to claim 1, wherein the transaction is a financial transaction.

13. An integrated circuit controlled transaction management method intended to execute between an ICC and a terminal connected or not to a central unit, a transaction consisting of at least one execution of the following sequence:

creating a communication link between the ICC and the terminal;

performing a compatibility check to ensure that the ICC and the terminal are mechanically and electrically compatible;

selection of an application contained in the ICC and the terminal, which application defines a set of commands and the associated data set that defines the transaction in terms of the specific ICC and the terminal combination present;

execution of said application on the ICC terminal system; and termination of the transaction, which optionally includes breaking of the communication link between the ICC and the terminal, wherein the system uses an interpreter which manages the execution of an application, either on the ICC, or on the terminal or on both, new applications or parts thereof or upgrades or improvements to existing applications being stored on the ICC in an interpreted language.

* * * * *